(12) United States Patent
Johnson et al.

(10) Patent No.: US 6,349,586 B1
(45) Date of Patent: Feb. 26, 2002

(54) APPARATUS AND METHOD FOR ANNEALING CONTAINER SIDE WALL EDGE FOR NECKING

(75) Inventors: Dean Lee Johnson, Littleton; Terre Reingardt, Broomfield, both of CO (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 09/571,007

(22) Filed: May 15, 2000

Related U.S. Application Data

(63) Continuation-in-part of application No. 09/255,688, filed on Feb. 23, 1999, now abandoned.

(51) Int. Cl.[7] .............................................. B21D 41/04
(52) U.S. Cl. ........................................ 72/342.1; 413/69
(58) Field of Search ................................ 219/653, 655, 219/675; 413/69; 72/342.1

(56) References Cited

U.S. PATENT DOCUMENTS

| | | | |
|---|---|---|---|
| 2,355,792 A | 8/1944 | Franck | 113/51 |
| 2,439,517 A | 4/1948 | Johnson | 219/47 |
| 3,694,609 A | * 9/1972 | Kennedy | 219/675 |
| 3,964,412 A | 6/1976 | Kitsuda | 113/7 R |
| 4,220,106 A | 9/1980 | Supik | 113/120 |
| 4,372,719 A | 2/1983 | Supik | 413/9 |
| 4,441,354 A | 4/1984 | Bodega | 72/342 |
| 4,995,254 A | 2/1991 | Alznauer et al. | 72/342.1 |
| 5,058,408 A | 10/1991 | Leftault, Jr. et al. | 72/56 |
| 6,003,359 A | 12/1999 | Futamura et al. | 72/404 |

FOREIGN PATENT DOCUMENTS

| | | | |
|---|---|---|---|
| JP | 55-54228 | 4/1980 | B21D/51/26 |

\* cited by examiner

*Primary Examiner*—Lowell A. Larson
(74) *Attorney, Agent, or Firm*—Sheridan Ross P.C.

(57) ABSTRACT

The trimmed edge of a drawn and ironed aluminum alloy container body is heated to provide a substantially circumferentially uniform profile in the region adjacent an open end, prior to necking of such region. The temperature profile is sufficient to provide the region to be necked with an annealing temperature, preferably involving a temperature, at the trimmed edge, up to about 550 F. or more, before partial cooling. Annealing in this fashion is believed to improve formability in such a fashion that tensile and yield strength progressively increasing during the necking operations.

7 Claims, 8 Drawing Sheets

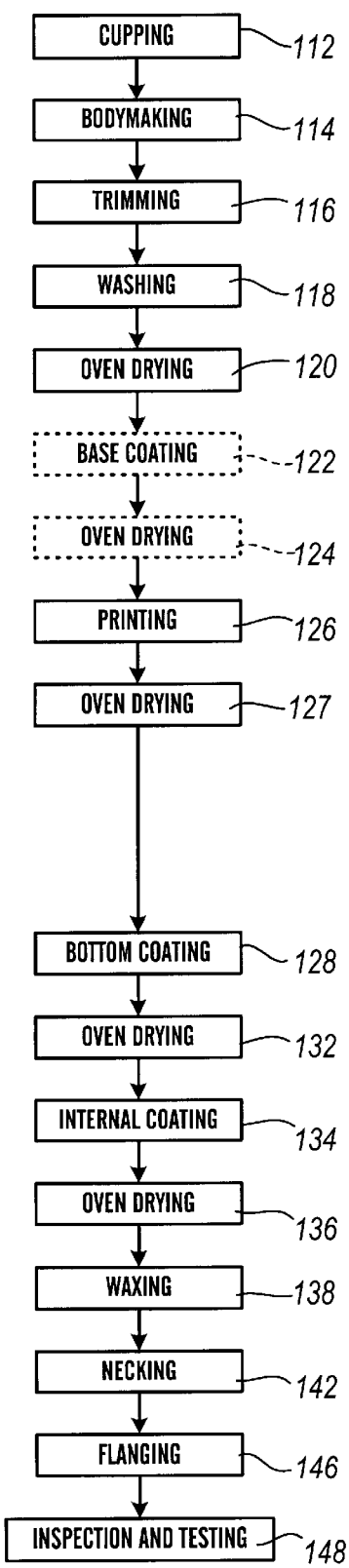
FIG. 1 - Prior Art
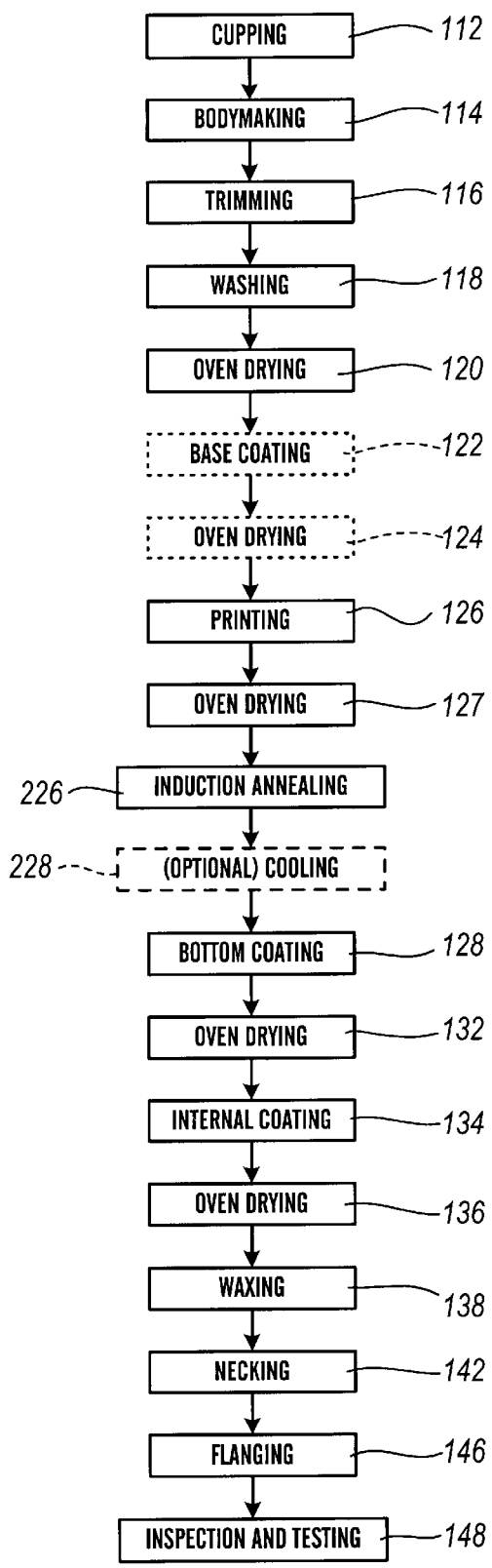
FIG. 2

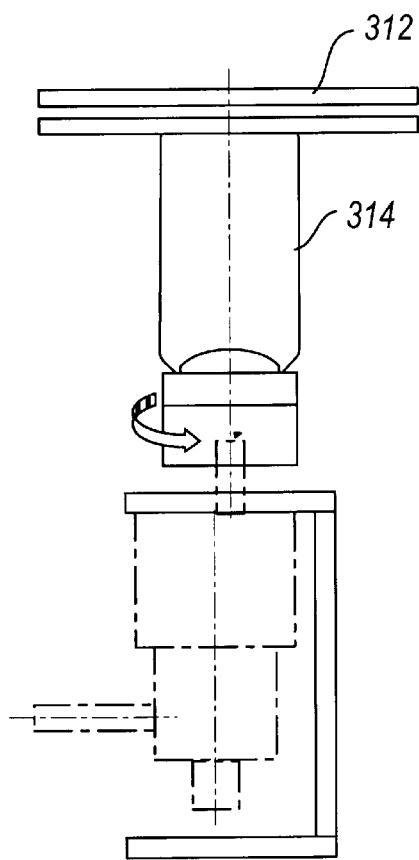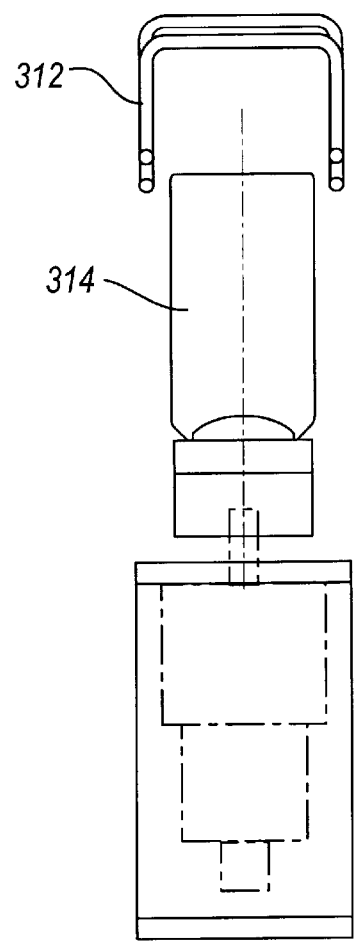
FIG. 3A
FIG. 3B

APPARATUS AND METHOD FOR ANNEALING CONTAINER SIDE WALL EDGE FOR NECKING This application is a Continuation-In-Part application of U.S. patent application Ser. No. 09/255,688, filed Feb. 23, 1999, now abandoned, which is incorporated herein by reference in its entirety.

FIELD OF THE INVENTION

The present invention relates to an apparatus and method involving selective heating of the edge of a container sidewall prior to a necking operation and, in particular, heating substantially to an annealing temperature.

BACKGROUND INFORMATION

A number of container fabrication processes involve closing one or more open ends of a container body with a container endpiece which has a perimeter different from the sidewall perimeter. For example, a typical 12 ounce aluminum beverage container has a cylindrical side wall with a diameter of roughly 2½ inches (about 6.4 cm) but an upper endcap with a diameter of roughly 2⅛ inches (about 5.4 cm). Thus, in many container fabrication processes, the region adjacent the sidewall open end(s) is faired in (or, in some cases, faired out) to match the diameter of the sidewall edge to the diameter of the edge of the endcap (typically allowing for provision of a rim or flange for double seaming or otherwise connecting the two pieces). This process of reshaping the cylindrical sidewall to a portion of the cylindrical sidewall to reduce (or enlarge) the diameter near an open end is referred to as "necking". Many of the pre-necking processes are performed at various temperatures, including somewhat elevated temperatures such as elevated temperatures employed in washing, drying of inks or other coatings, and the like. Typically, such upstream processes are performed at temperatures substantially below the annealing point of the container material such as below about 500° F. For example, for the aluminum alloys used in many beverage containers, the annealing temperatures are in the range of about 500° to about 825° F., preferably around 600–700° F. and more preferably around 625° F. or higher. A number of procedures and apparatuses to achieve necking are used, or have been proposed, including die necking, spin necking, and the like. Regardless of the apparatus and procedure used for the necking operation, typically a certain defect rate occurs during the necking operation. Accordingly, it would be useful to provide for a can fabrication procedure and apparatus which can assist in reducing the defect rate of necking operations.

Furthermore, current efforts to avoid defects during necking (and other) operations involve keeping those processes performed prior to necking under relatively strict control (including parameters such as material thickness, coating materials and temperatures and the like). Accordingly, it would be useful to provide a can fabrication procedure which results in a higher-tolerance necking operation (i.e. a necking operation which can tolerate a wider variance in parameters of upstream operations without unduly increasing necking defects), e.g. so that a greater latitude in upstream process steps can be employed without unduly increasing necking defect rates.

SUMMARY OF THE INVENTION

The present invention involves a controlled heating of the container edge prior to necking, for a desired amount of time and in such a manner to achieve a substantially circumferentially, uniform elevated temperature profile and sufficient to achieve annealing of the region to be necked. Preferably the temperature profile achieved is greatest in the region where greatest necking occurs and avoids wasting energy on heating regions of the body which will not be necked.

In one embodiment, the trimmed edge of a drawn and ironed aluminum alloy container body is heated to provide a substantially circumferentially uniform temperature profile in the region adjacent an open end, prior to necking of such region, although container bodies made of other materials could be utilized, such as steel container bodies that are intended to contain food. In particular, the temperature profile is sufficient to provide the region to be necked with an annealing temperature, preferably involving a temperature, at the trimmed edge, of (a) at least 400° F., and more preferably (b) at least 575° F., and most preferably (c) at least 600° F. up to about 625F or more. Moreover, an elevated annealing temperature of at least 400° F. at least 0.20 inches down the can side from the open end is desirable, and more desirably the annealing temperature should be 575° F. to 600° F. at 0.30 inches down from the open end of the can. Annealing within the above ranges is believed to improve formability during the necking operations while retaining the desired can wall strength. Moreover, a decrease in defective cans is believed to result with each elevation in temperature (a) through (c), and with an annealing temperature extending further down the can in the range of 0.20 inches to 0.40 inches.

BRIEF DESCRIPTION OF THE DRAWINGS

FIG. 1 is a flow chart depicting process steps of a container fabrication process, including a necking operation, according to previous procedures;

FIG. 2 is a flow chart depicting a container fabrication process according to one embodiment of the present invention;

FIG. 3A and FIG. 3B are side and front views of a laboratory induction heating apparatus for testing an annealing process according to an embodiment of the present invention;

DETAILED DESCRIPTION OF PREFERRED EMBODIMENTS

Figure 8:
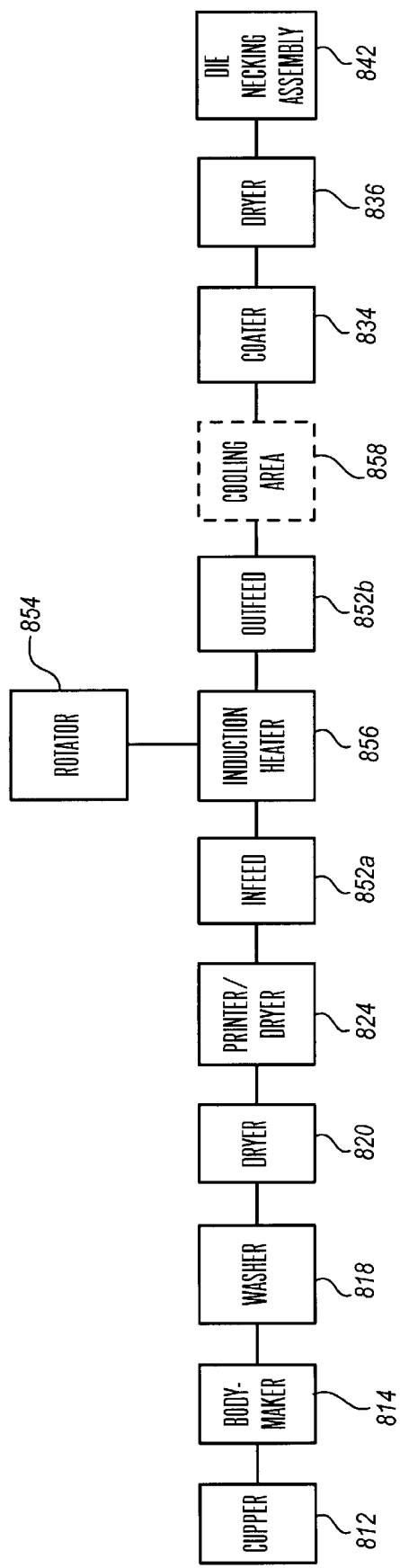
FIG. 8 is a block diagram showing selected components of a certain fabrication line that can be used in accordance with embodiments of the present invention.

FIG. 1 depicts a number of process steps used in certain two-piece container fabrication procedures. A cupping step 112 provides a cup via cupper assembly 812 (FIG. 8) which cuts outs circular blanks of aluminum and forms the blanks into shallow cups. A bodymaking step 114 (FIG. 1) uses a bodymaker 814 (FIG. 8) with a punch mounted on a ram to push the cups through a series of tooling dies that redraw and iron the cups into container bodies. A trimming step 116 trims the open end of the container bodies to a uniform height resulting in cans 314 (FIG. 3). The washing step 118 is provided by a washer 818 which washes and rinses the container bodies, followed by drying 120 in a dryer oven 820 in preparation for application of internal coatings and labels. Optionally, a base coating step 122 may optionally be provided where a base coat is desired as a base for traditional printing. If a base coat is applied, it is dried 124 in a drying oven. The printing step 126 (followed by drying step 127) prints labels on the container bodies and typically a thin film of lacquer is placed over the label to protect it 126. Such coating, drying, printing and drying steps are performed by the components internal to the printer/dryer box 824 (FIG. 8).

Subsequently and preferably, lacquer is also provided to the rim around the bottom of the cans 314 (not shown in FIG. 8). An additional oven drying step 132 (also not shown in FIG. 8) is used for drying the base coating materials. A thin layer of lacquer or other material is applied 134 by a coater 834 (FIG. 8) to the inside of the cans to protect product integrity followed by drying 136 of the internal coating in a drying oven 836. Typically, a waxing step or similar lubricant application step 138 is performed prior to the necking operation 142 performed by a die necking assembly 842. After necking is completed, flanges (e.g., for forming a seam to an endcap) are formed 146 and the can is inspected and tested 148.

As seen in FIG. 2, embodiments of the present invention provide an annealing step 226 for changing the aluminum characteristic of the cans so that the open ends of the cans are more reliably necked thereby reducing can defects. In the embodiment depicted in FIG. 2, the annealing step 226 occurs after the washing and drying steps 118, 124. Other stages at which the annealing step is currently contemplated to be performed include after the printing step 126, or after internal coating 134, and more particularly, after the overdrying step 127, or the overdrying step 136. The present invention can, however, be implemented by performing annealing at any of a number of steps prior to necking, such as any time after trimming 116 and before necking 142. In general it is believed it may be desirable to perform annealing after the last coating and drying step 134,136, provided the annealing will not harm or degrade the coatings or printing previously applied. Note that it is believed that, even though the open can end may reach a temperature of greater than 600° F. for, e.g., about 0.02 sec, the coatings and printing are not affected sufficiently to cause an increase in can rejections even though at least one coating extends to the open ends of the cans. Thus, it is an aspect of the present invention that such annealing may be performed after all coating and printing operations are performed.

Although it is possible to achieve annealing in a number of fashions, in one embodiment, an induction heating procedure is used. Induction heating, particularly as described herein, is believed to be particularly useful in connection with annealing aluminum container body edges, such as cans 314, prior to necking because this procedure can be particularly useful in achieving a desired temperature profile in the necking region (e.g., 0.2 to 0.4 inches down the can from the open end), and can be useful in providing for circumferential uniformity of the temperature profile. In particular, the aluminum containers have their open end heated in the range of 400° F. to 650° F., and more preferably at least 600° F. Preferably the annealing temperature profile is achieved during a predetermined duration of heating of, for example, 0.02 seconds. Note that the induction heating may be followed by a cooling step 228 if there are further desired printing or coating (and drying) steps, prior to the necking procedure 142.

A number of induction heating devices 856 and associated conveyance devices can be used for achieving the desired annealing. FIGS. 3A and 3B illustrate a laboratory bench configuration for achieving a desired annealing. The apparatus depicted in FIGS. 3A and 3B, while suitable for testing operations, may be impractical for high-production use in a container body fabrication line. However, the apparatus of FIGS. 3A and 3B assist in describing suitable annealing steps and apparatus, and those of skill in the art after understanding the present disclosure will understand how to implement appropriate annealing apparatus and procedures, as well as conveyance in the infeed/outfeed 852a, b and similar associated steps and apparatus, in order to adapt an annealing step to a practical production line.

As shown in FIGS. 3A and 3B, preferably induction coils 312 are positioned adjacent the open end of the can body 314. Preferably the apparatus and procedure is configured to achieve a substantially circumferentially uniform temperature profile. In the embodiment of FIGS. 3A and 3B, this is achieved by providing relative rotation between the induction coils 312 and the can body 314 (in this case, by rotating the can body 314). The amount of time during which the induction coils 312 are energized will vary with such factors as the heat generated by the induction coils, the distance to the can body, the thickness of the container body side walls and the like. To facilitate use of the process in a practical manner on a container fabrication line, it is preferred to perform annealing as rapidly as possible, such as in less than about a second. In one embodiment, container edges are annealed in a period of about 100 milliseconds.

Figure 4:
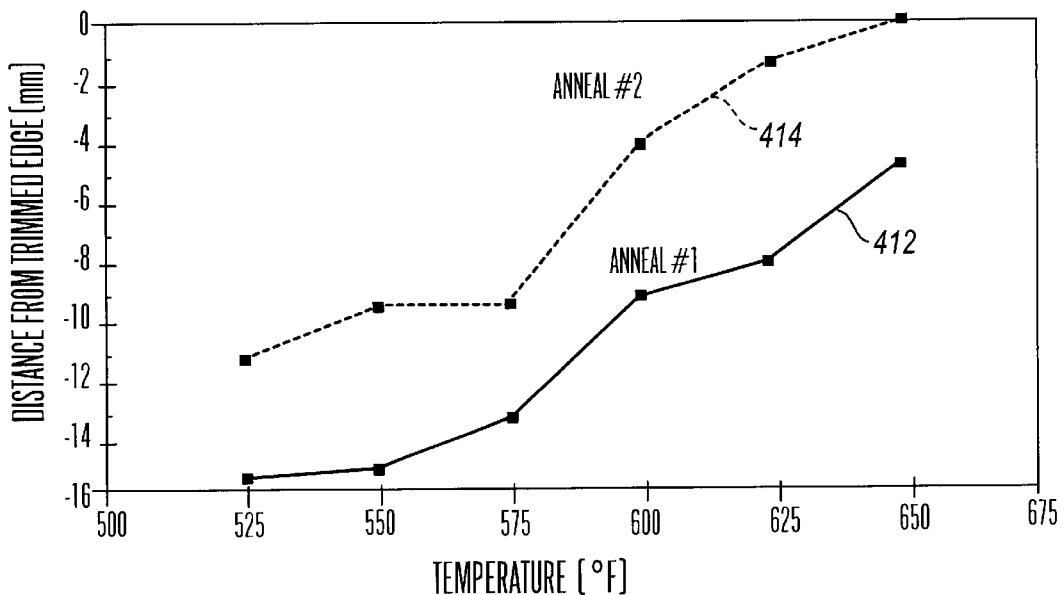
FIG. 4 illustrates heat profiles for first and second annealing processes according to embodiments of the present invention.

FIG. 4 illustrates the average temperature profiles 412, 414 (as a function of distance from the trimmed edge), achieved during two different annealing regimes (hereafter "anneal #1" and "anneal #2"). The data depicted in FIG. 4 represents profiles averaged over a number of container bodies and was determined using heat sensitive paints. Although the illustrated profile for anneal #2 indicates a maximum temperature of 650° F., it is noted that a heat sensitive paint indicating a temperature of 675° F. was unavailable and thus it is possible that the temperature at the trimmed edge for anneal #2 was greater than 650° F. It is believed the temperature at the trimmed edge for anneal #2 exceeded 675° F., and the temperature of the edge appeared to be substantially circumferentially uniform.

Following heating, optionally, containers may be cooled in step 228 in a cooling area 858 assisted, if desired, by fans or other air cooling devices, e.g., for cooling, if desired, to a point that internal coating and similar downstream steps could be performed (typically involving cooling to at least about 400° F. or less) before being subjected to a necking operation 142.

Figure 5:
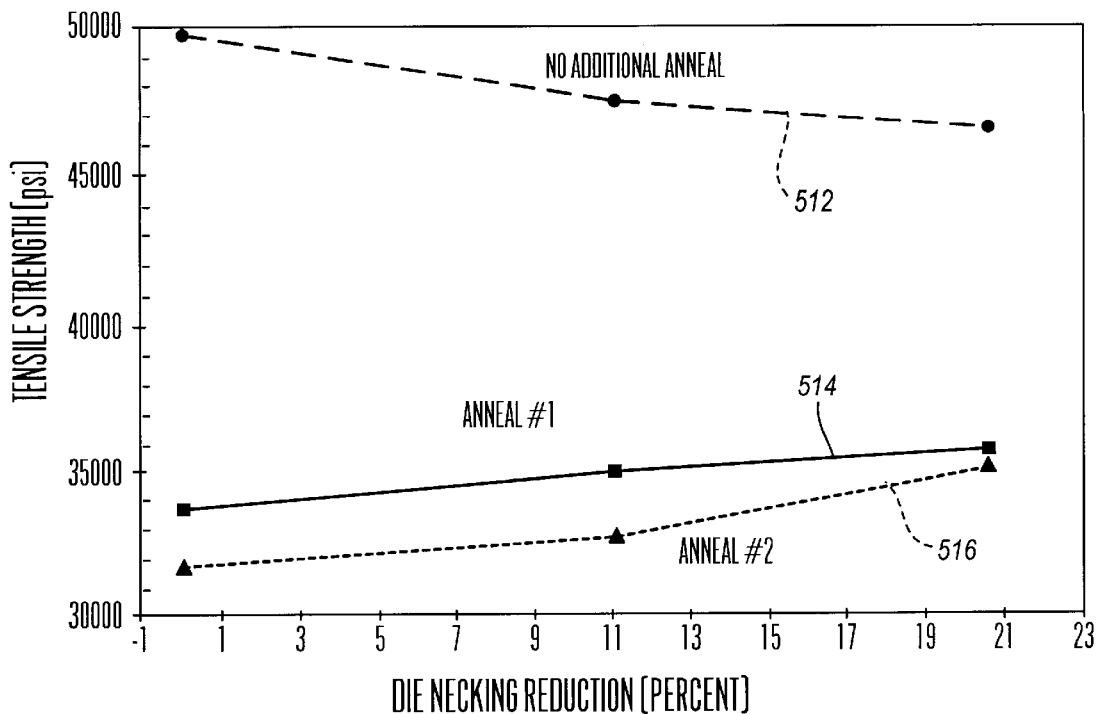
FIGS. 5 and 6 depict the effect of the annealing process, as depicted in FIG. 3, on tensile strength and yield strength, respectively.
Figure 6:
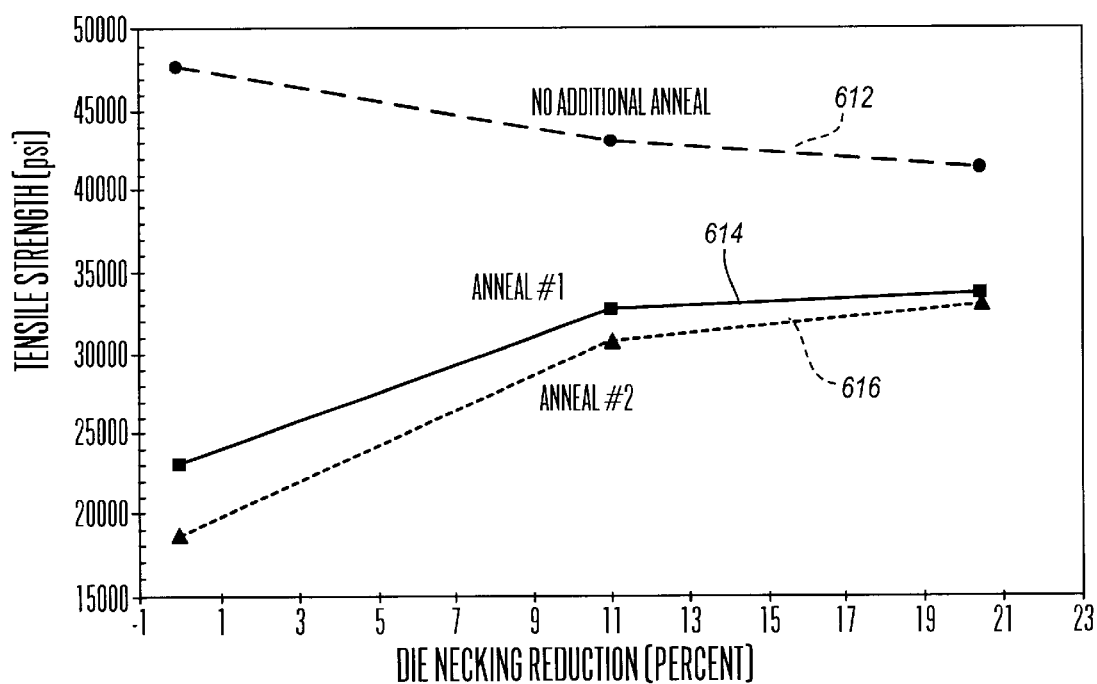

The effect of annealing was verified with respect to a necking operation that involved a plurality of die necking and/or spinning steps, each step involving successively greater percent diametrical reduction. In general FIGS. 5 and 6 illustrate that when no annealing step is performed 512, 612 successive die necking steps produce a decrease in both tensile strength and yield strength and that, for cans subjected to either of the anneal profiles (anneal #1 or anneal #2) of FIG. 4, prior to necking, the tensile strength 514, 516 and yield strength 614, 616 increased with successive die necking steps.

EXPERIMENTAL

Figure 7:
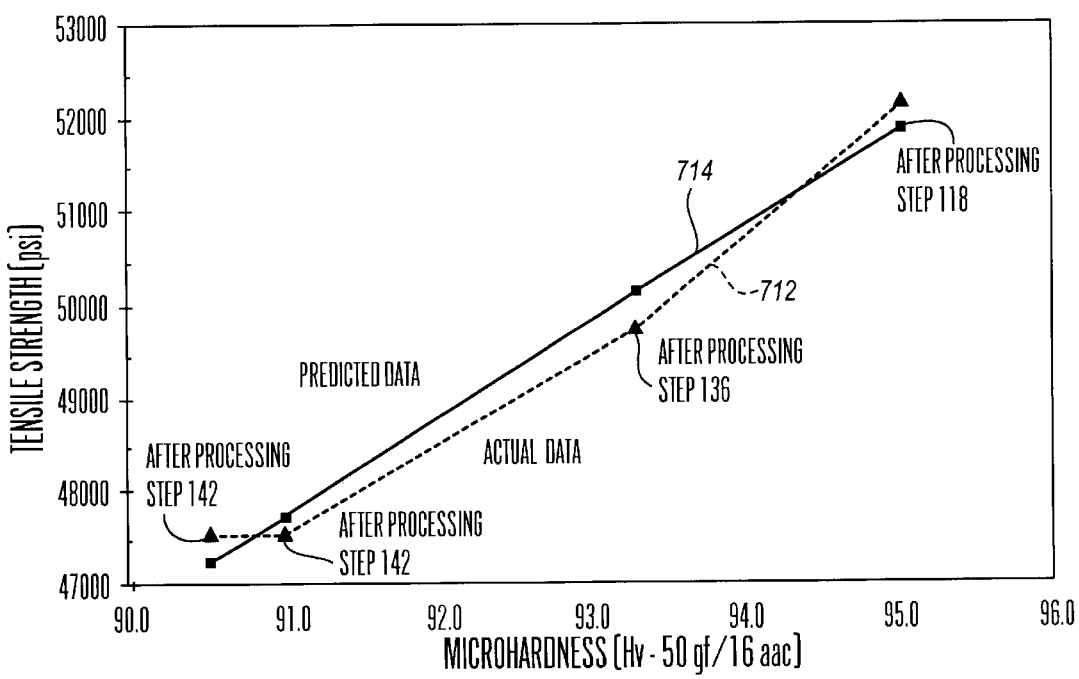
FIG. 7 depicts the relationship of tensile strength to yield strength results for an annealing according to embodiments of the present invention.

Approximately 1,000 container bodies were fabricated on a pilot fabrication line including a one-out cupper, a Ragsdale® bodymaker, a four-stage washer, a single-mandrel overvarnish (OV) unit and a single gun inside coating (IC) spray machine. Cans were made using 3104 aluminum alloy at 0.105 starting gauge, a 0.0058 inch nominal thickwall, and a 0.00385 nominal thinwall with trimming providing for a 4.874 inches can height. A 14 stage necking procedure to a 202 plug diameter was employed. In one set of tests, 14 die neck operations were successively performed. In a second set, 11 die neck operations were performed (providing 16.6 percent reduction) following by a spin neck operation. Induction heating, using the setup illustrated in FIGS. 3A and 3B was used. Induction heating was performed after trimming and washing steps and prior to the overvarnish step. Induction annealing involved heat treatments performed during 10 revolutions of the can for a total of 14 seconds heating. FIG. 4 illustrates temperature profiles observed for the two types of annealing. Temperatures were observed to be substantially circumferentially uniform. Uniformity is believed to be at least partially a result of relative rotation of the can with respect to the induction coils. Ten cans from each of 24 trials were sampled for a tensile strength test and microhardness measurements. Samples were taken from 90° locations in the thick wall, lengthwise around the can (transverse to the ironing direction). Tensile test samples were randomized to minimize the effects of operator and machine variations. Microhardness was measured in each can at three locations in the 270° location at 0.6 inches, 0.13 inches and 0.38 inches from the trimmed edge. FIGS. 5 and 6 illustrate results from these tests, averaged with respect to the two anneal processes, compared to tests in which no anneal was performed. FIG. 7 shows the correlation between tensile strength and microhardness after the washing step 118, coating and oven drying step 136 and necking step 142, respectively for actual 712 data and predicted 714 data. FIG. 7 shows that, contrary to expectations, there appears to be a correlation between tensile strength and hardness. The product tensile strength versus microhardness provides a linear regression $R^2$ value of 0.976.

The results of the tests are believed to indicate that aluminum decreases in strength as it is die necked. The results (FIGS. 5 & 6) also indicate that unannealed cans lose strength going through the die necking operation, and that annealed cans gain strength going through the die necking operations. Results of the tests are believed to suggest that effects such as split flanges, puckers, and window necks may be caused by mechanical failure (e.g. tooling set up) rather than typically occurring as a result of brittle fracture.

In light of the above description, a number of advantages of the present invention can be seen. The present invention provides a procedure which can assist in reducing defects of a container necking operation by annealing, in a circumferentially uniform manner, the necking region of the container, preferably after trimming. Without wishing to be bound by any theory, it is believed that such circumferencially uniform annealing provides for increased formability of the necking region and may result from an annealing step causing the necking region to gain strength during the necking process.

A number of variations and modifications of the invention can be used. Although the present invention has been illustrated with respect to operations performed using certain types of aluminum alloy containers, other types of aluminum alloy containers can also be used. Although the present invention is described in connection with necking operations which include die necking, other types of necking operations can be used such as spill necking. Although particular heat profiles and heating times were illustrated, it is believed other heating profiles and/or times may be profitably employed, e.g. to account for differences in materials, sidewall thicknesses, and the like. Although the annealing which is performed after cupping operations and body forming operations, has been described in connection with reducing the occurrence of necking defects, it is possible to use annealing of some or all of the container body for other purposes, such as when it is desired to change sidewall strength in some or all of the container body regions, for other purposes.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

In another embodiment of the present invention, the induction heater 856 is provided between the dryer 836 and the die necking assembly 842. Moreover, such an embodiment may not require can rotator 854. In particular, it is within the scope of the present invention to include embodiments wherein the cans 314 that have been through all coating and printing operations have each of their open ends substantially uniformly annealed without rotating the can but producing an even annealing. That is, for each depth of zero or more length into the can from the open end, the annealing step produces a substantially uniform temperature about the circular portion of the can body corresponding to the depth.

Figure 9:
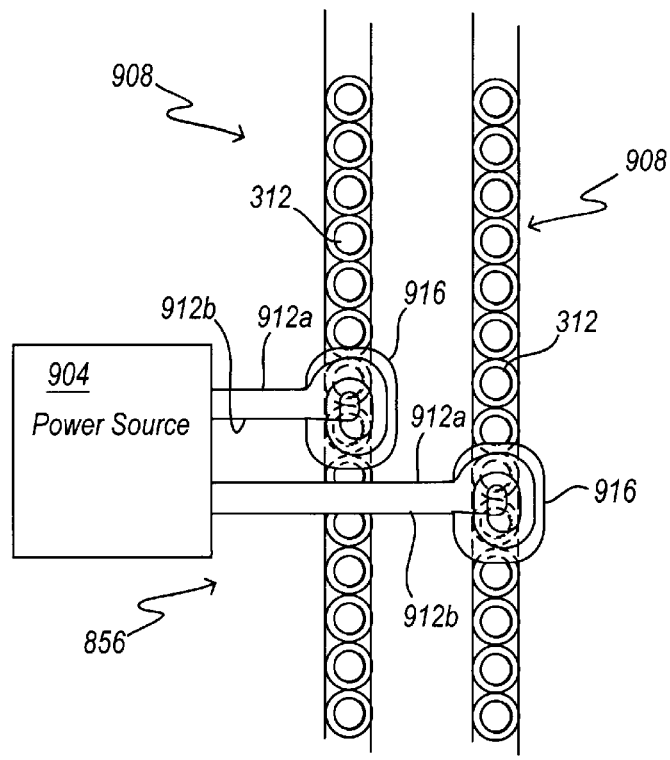
FIG. 9 is a top view of an embodiment of the present invention wherein induction coils 916 are used to heat the open ends of cans 312.
Figure 10:
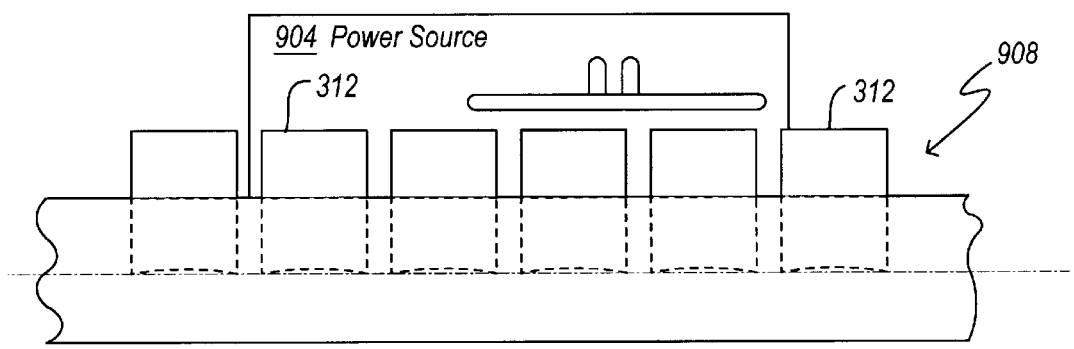
FIG. 10 is a side view of the embodiment of FIG. 9.

FIGS. 9 and 10 illustrate a heating assembly that includes an induction heater 856 for performing such uniform annealing without can rotation. An electrical power source 904 is provided substantially adjacent to the position of one or more can lines 908 where the annealing of the can open ends is to be performed (e.g., between dryer 836 and die necking assembly 842). Projecting from the power source 904 are one or more pairs of conducting rods, each pair having conducting rods 912*a* and 912*b*. Each pair of conducting rods supplies electrical current to an attached induction heating element 916. In one embodiment, the electrical power supplied to the heating element 916 is 1,100 watts per square inch. However, there may be variations in electrical power supplied over a relatively wide range of power depending on the design of the heating element(s), the spacing between heating elements and the can open ends, the speed of the cans and the extent or depth of heating along the lengths of the can bodies from their open ends. Each heating element 916 is positioned substantially parallel to the open end of the cans 314 that travel underneath the element. In general, it is believed it the heating elements 916 should be as close to the open can ends as possible without causing electrical shorts to occur between such heating elements and the cans traveling therebeneath. Accordingly, in one embodiment, a separation of approximately 0.25 inches between the open ends and the heating element is used. However, it is within the scope of the present invention that other separations can be utilized, preferably, within the range of substantially zero separation (at least sufficient separation such that there is no contact between the heating element and the container body) up to about 1.5 inch separation, although greater separations are possible, but usually at a sacrifice of unnecessary power usage. Regardless of the separation used, each element 916 is configured and positioned above its corresponding can line 908 so that the open can ends of the can line are rapidly and uniformly annealed. Note that the cans may travel at a speed of approximately 40 mph, or approximately 2,000 cans per minute (2.6 inch diameter cans), or in the range of 3 mph–50 mph. The can annealing is to a predetermined depth into each can, such depth being in the range of 0.20 to 0.40 inches and having annealing temperatures in a preferred range of 525° F. to 650+° F. Moreover, it is an aspect of the present invention that at a can depth in the range of 0.5 inches, the temperature of the can does not rise above 400° F. Thus, since the coatings and printing on, e.g., aluminum cans are able to withstand temperatures within this latter range without any noticeable deterioration, the coatings and printings are not sufficiently affected by the annealing process to cause can rejection It is also worthwhile to mention that the induction heater 856 may be preferably of a type known as a current driven coil system by those skilled in the art. Such current driven coil systems are advantageous in that for a given power level each can passing underneath an element 916 is heated substantially identically whether one or a plurality of cans pass under the element 916 at a fixed speed.

Figure 11:
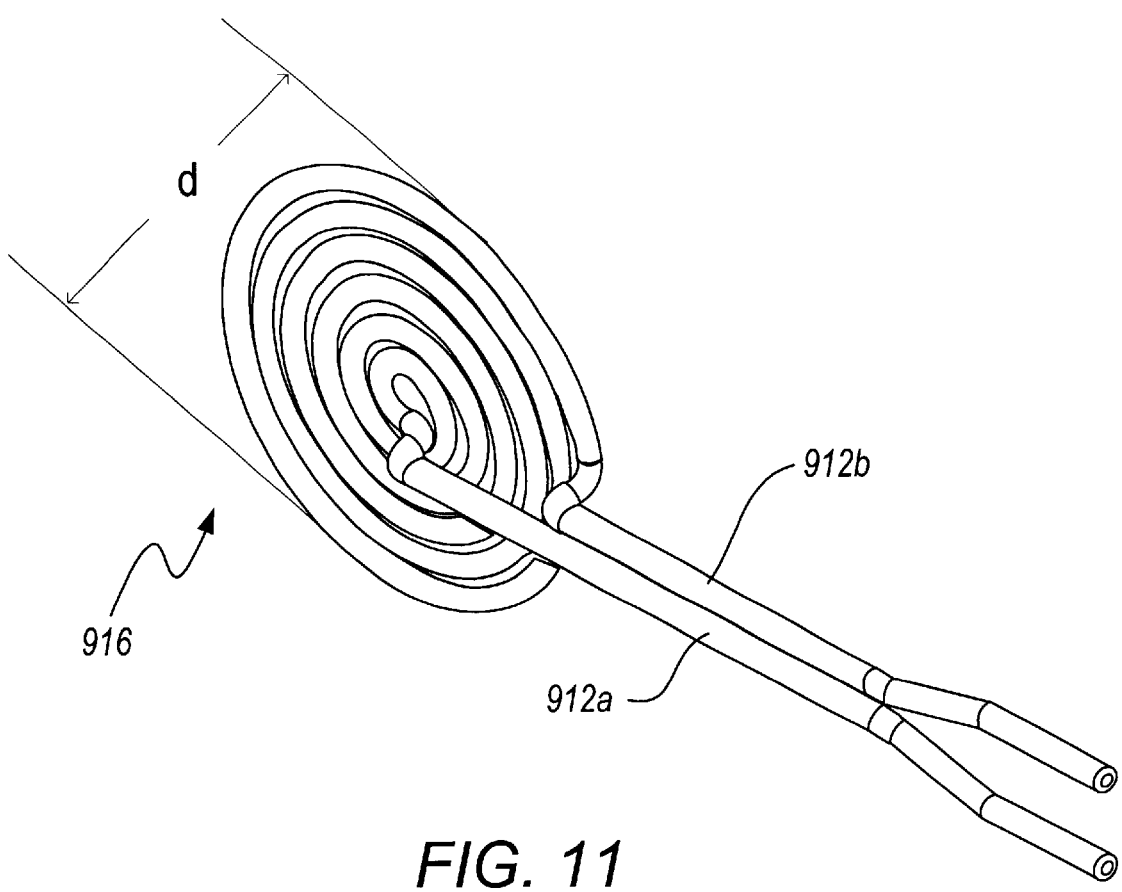
FIG. 11 is a more detailed illustration of an embodiment of an induction coil for the present invention.
Figure 12A:
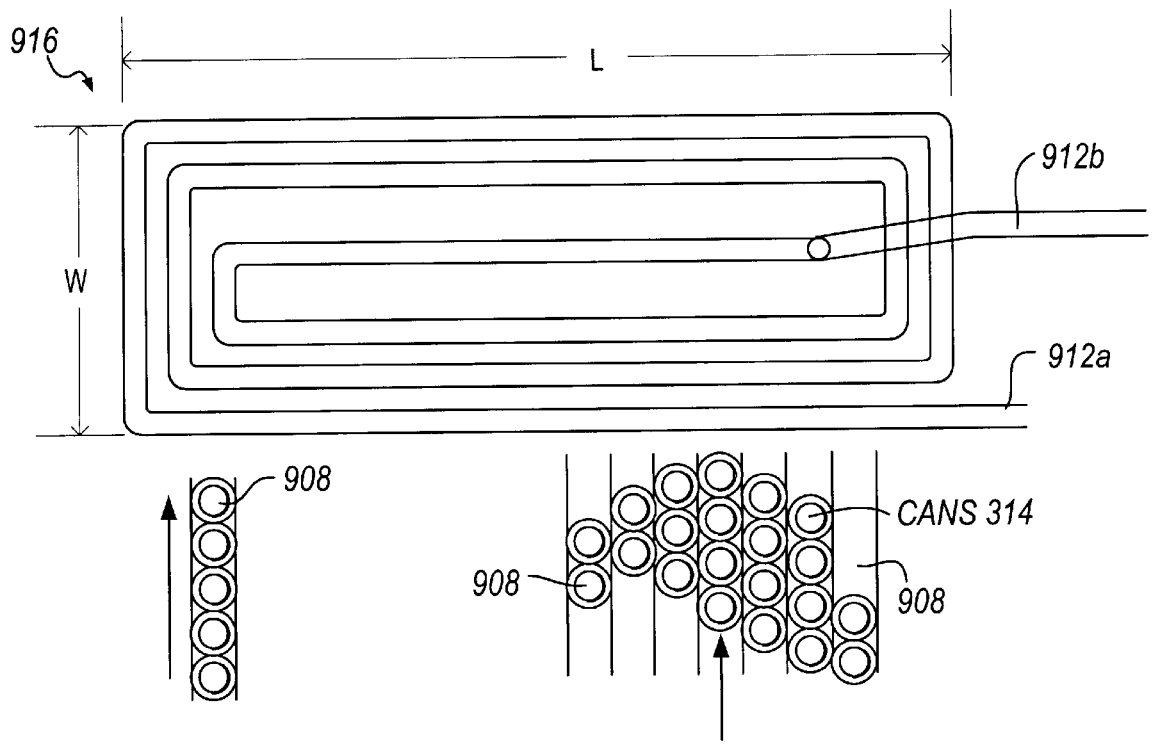
FIG. 12A illustrates another embodiment of an induction coil in a side view.
Figure 12B:
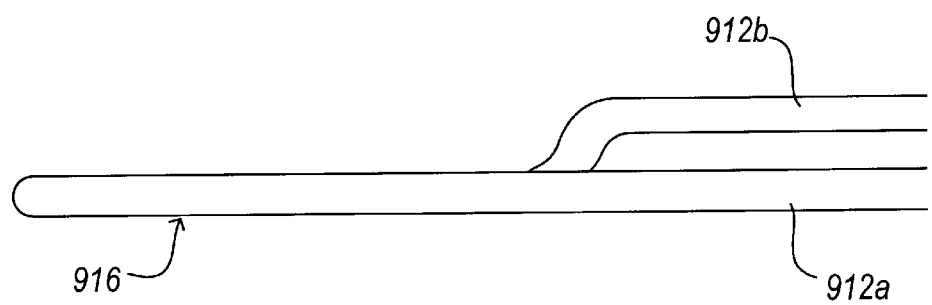
FIG. 12B is a top plan view of the induction coil of FIG. 12A, as well as diagrammatically illustrating a number of lines of cans positioned relative to this induction coil.

Embodiments of the present invention may have differently configured elements 916. Each element 916 may be configured as in FIG. 11 (shown in an oblique view), or alternatively as in FIGS. 12A and 12B. Note that such induction coils 916 may be of various sizes depending, e.g., on number of cans which are desired to be annealed simultaneously. For example, the diameter d of the element 916 of FIG. 11, or the length L of the element 916 of FIG. 12A may vary from; e.g., 4.6 inches to 6 feet with the smallest size used for annealing cans of a single can line 908 (e.g., cans of 2.6 inch diameter), and the larger sized elements 916 used for annealing cans from multiple can lines simultaneously. Note that it is also an aspect of the present invention that each element 916 and the can lines 908 therebeneath it are preferably positioned relative to one another so that cans travel underneath the element and sufficiently within the extent of the element traverse to the direction of can travel. Accordingly, no can line 908 preferably has its cans subjected to a substantially attenuated annealing power due to an excessive exposure to the reduced inductive heating of "edge effects" of the magnetic field generated about the element 916 as one skilled in the art will understand. Moreover, note that the element 916 embodiment of FIGS. 12 may be particularly advantageous for simultaneous can annealing from multiple can lines in that every can passes underneath a uniform width w of the heating element, thus providing a substantially uniform annealing of cans from different can lines 908. In a related embodiment, instead of the cans passing underneath the element 916 of, e.g., FIGS. 12, in can lines 908, the cans 314 may be moved at a slower speed in an amorphorous stream of continuous cans, wherein contiguous cans have no production imposed predetermined positional relationship.

To perform such shallow and uniform can annealing within, e.g., 0.20 to 0.40 inches of the can open ends, the following factors may be taken into account by the present invention:

(a) The configuration of the elements 916;

(b) The electrical power supplied to and/or the temperature induced in the cans by the elements 916;

(c) The spacing between each element 916 and the open can ends traveling therebeneath;

(d) The desired annealing graph indicating the desired temperature at each depth into the can bodies or along the longitudinal extents of the can bodies from their open ends; and (e) The speed of and/or the time duration that each can is underneath an element 916.

Note that the factors (a) through (e) immediately above are substantially interrelated in that changing any one of the factors may substantially change the annealing result. In one embodiment, the element 916 configuration (a), and the spacing (c), remain fixed, while the electrical power and/or the induced temperature (b) is determined by the desired annealing graph (d) and/or by the can speed/time (e). Accordingly, in some embodiments, the electrical power provided to an element 916 may be a function of the speed of the cans passing underneath. For example, the electrical power provided to the element 916 increases when can speed increases, and decreases when can speed decreases. In one simple embodiment, the electrical power is not provided for annealing until the cans are determined to be traveling at a predetermined minimum speed underneath the element 916. Thus, when the speed of the can line 908 is slower than this predetermined speed, cans are not annealed, thereby resulting in a higher defect rate for such cans.

In one embodiment, a heating assembly is provided that includes at least two heating elements. Each of these heating elements has a plurality of loops so that each of the heating elements could be defined as a heating coil. Each heating element could also be defined as having a longitudinal center axis past which two or more container bodies could be caused to move at the same time during the heating of each container body near its open end. Each of these heating elements might have a width of about 12 inches, for example. These two coils could advantageously be located at different orientations relative to the container bodies that pass below each of them. For example, one of the heating elements might be positioned at 90 degrees relative to the other heating element. Additionally or alternatively, the two heating elements could be of different shapes. The particular container body would move past one of these two heating elements and then past the other heating element. The different orientations relative to the moving container bodies and/or their different shapes may be useful in compensating for, or taking into account, "hot and cold spots" associated with one or both of the heating elements. That is, one of the two heating elements may have a "hot spot" and/or "cold spot" that affects the heating of a container body that passes below it. However, when that same container body continues its movement, it then passes below the other of the two heating elements so that it does not experience such a hot spot or cold spot as it moves beneath the second heating element. Accordingly, desired heating of the particular container body is achieved, while compensating for unacceptable heating from or deficiencies in the heating elements, if they were not used together.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures functions, ranges or steps are disclosed herein, and without intending to publicly dedicate any patentable subject matter.

What is claimed is:

1. A method for forming a neck in each of a plurality of container bodies including a first container body having a longitudinal extent, an open end and a region that extends a first container body distance downwardly from the open end along the longitudinal extent of the first container body, comprising:

providing at least a first induction heating element;

moving the plurality of container bodies including the first container body relative to said first induction heating element and heating at least the region of the first container body during said moving step, the first container body distance associated with the region being at least 0.2 inch, wherein during said moving step said first induction heating element is spaced above the open end of the first container body by a spatial distance that is in the range of no contact between said first induction heating element and the first container body to no greater than 1.5 inches, said heating step includes heating the region to a temperature of at least 525° F. while the temperature of the container body at a second container body distance of 0.5 inch is no greater than 400° F.; and necking at least the region of the first container body using a necking process;

wherein the first container body is located below said first induction heating element for a desired time duration during said heating step, with said desired time duration depending on said spatial distance and power applied to said first induction heating element, said time duration depending on a speed of the first container body during said moving step and said speed being in the range of 3–50 mph.

2. A method, as claimed in claim 1, wherein:
said moving step includes moving the plurality of container bodies serially relative to said first induction heating element.

3. A method, as claimed in claim 1, wherein:
said first induction heating element has a longitudinal center axis and said moving step includes moving at the same time more than one of the plurality of container bodies past said longitudinal center axis of said first induction heating element.

4. A method, as claimed in claim 1, further including:
coating at least the region of the first container body with at least one of a color and indicia and in which said coating step is conducted before said heating step and in which the immediately next step after said heating step is said necking step.

5. A method for providing a neck on each of a plurality of container bodies including a first container body having a longitudinal extent, an open end and a region with a container body distance that extends from the open end downwardly from the open end along the longitudinal extent of the first container body, comprising:

providing at least a first induction heating element;

moving independently of container body rotation the plurality of container bodies including the first container body beneath said first induction heating element at a desired speed that depends on a spatial distance between the plurality of container bodies and said first induction heating element and also depends on power applied to said first induction heating element, said spatial distance being in the range of no contact between said first induction heating element and the first container body to no greater than 1.5 inches;

heating at least the region of the first container body during said moving step to a temperature of at least 525° F. for a first container body distance of at least 0.2 inch while the first container body is heated to no greater than 400° F. at a second container body distance of 0.5 inch, and during said moving step, the first container body moves at a speed in the range of 3–50 mph.; and necking at least the region of the first container body using a necking process.

6. A method, as claimed in claim 5, wherein:
said moving step includes moving the plurality of container bodies serially relative to said first induction heating element.

7. A method, as claimed in claim 5, wherein:
said plurality of loops of said first heating element define a longitudinal center axis and in which said moving step includes moving at the same time more than one of the plurality of container bodies past said longitudinal center axis of said first heating element.

* * * * *